Sept. 18, 1962 J. KEMENY 3,054,379

CHANNEL INDICATOR FOR TELEVISION TUNER

Filed May 2, 1960

INVENTOR:
JULIUS KEMENY,

BY Norman C. Fulmer
HIS ATTORNEY.

United States Patent Office
3,054,379
Patented Sept. 18, 1962

3,054,379

CHANNEL INDICATOR FOR TELEVISION TUNER

Julius Kemeny, Liverpool, N.Y., assignor to General Electric Company, a corporation of New York Filed May 2, 1960, Ser. No. 26,000
4 Claims. (Cl. 116—124.4)

This invention relates to tuners, for example television tuners, and more particularly relates to a channel indicator arrangement for indicating visually the channel to which the tuner is adjusted. The invention is particularly useful in combination with the tuner actuator mechanism disclosed and claimed in copending patent application Serial No. 25,990, filed concurrently herewith and assigned to the same assignee as the present invention.

An object of the invention is to provide visual channel indication for a channel selecting tuner.

Another object is to provide a visual channel indicator for a channel selecting tuner having an axially positionable control shaft.

A further object is to provide a visual channel indicator, for use in the channel selecting tuner disclosed in the above mentioned co-pending patent application, which functions mechanically rather than electrically.

Still other objects will be apparent from the following disclosure and claims, and from the drawing, in which:

Figure 1:
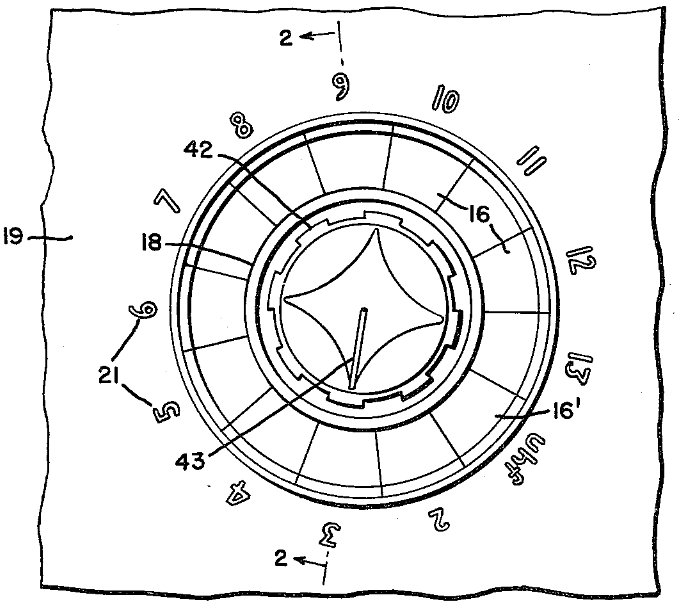
FIGURE 1 is a front view of a preferred embodiment of the invention.
Figures 2, 3:
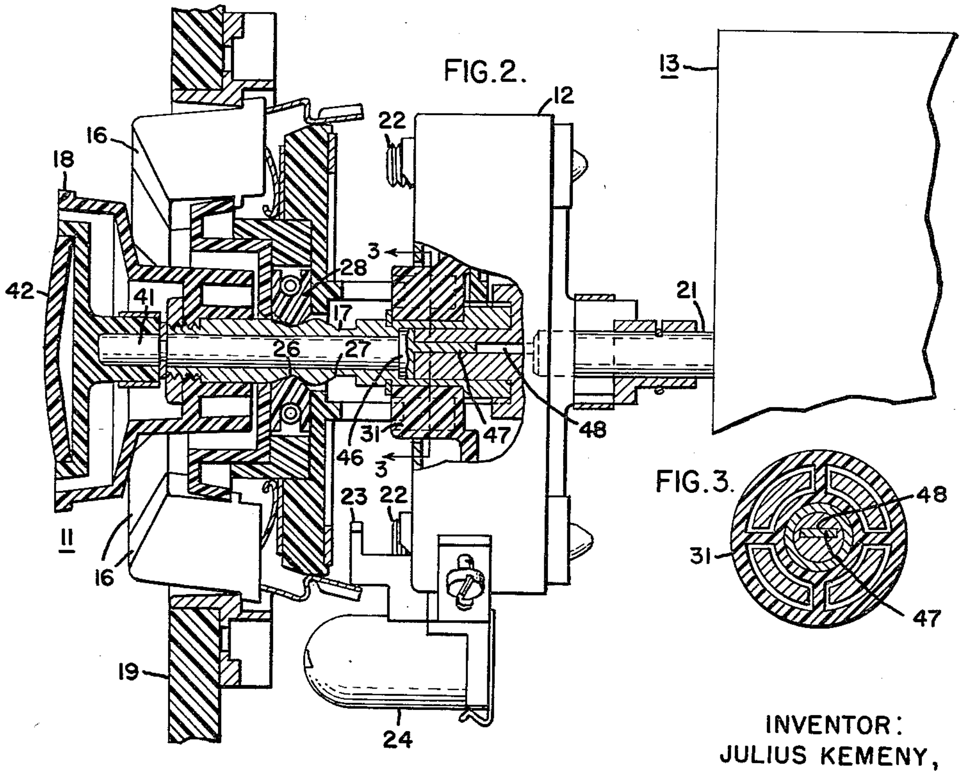
FIGURE 2 is an enlarged cross-sectional view taken on the line 2—2 of FIGURE 1.
FIGURE 3 is a cross-sectional view taken on the line 3—3 of FIGURE 2.

The invention comprises, in its preferred embodiment, a rotatable channel indicator rod positioned concentrically within a hollow control shaft of a tuner actuator mechanism, the shaft and rod being rotatable with respect to each other. An indicator knob is attached to the rod at the outer end thereof, and this knob is provided with a channel indicator mark near the rim thereof. The rod is coupled at the inner end thereof to the channel selector shaft of a tuner unit in a manner whereby they are joined together for mutual rotation thereof. As a further feature of the invention, the rod is captivated to the control shaft for axial movement therewith, and the rod and the channel selector shaft are coupled together for rotation by means permitting axial movement of the rod with respect to the channel selector shaft.

Now referring to the drawing, the preferred embodiment of the invention comprises a channel selector unit 11, a fine tuning turret 12 arranged behind the channel selector unit 11, and a tuner unit 13 arranged behind the fine tuning turret 12.

The channel selector unit 11 comprises a plurality of push buttons 16, preferably twelve in number, arranged in a circle, a control shaft 17 being concentrically positioned at the center thereof and being provided with a control knob 18 attached to the outer end thereof. The control shaft 17 is rotatable and is axially movable to two axial positions thereof, an "in" position and an "out" position. A channel number plate 19 is positioned around the circularly arranged push buttons 16 and is provided with channel indicia in the form of numbers from 2 to 13, which represent the twelve presently used very high frequency television channels. These channel numbers 21 are respectively adjacent the twelve push buttons 16 which represent the corresponding channels. A thirteenth push button 16′ may be provided in the circular arrangement of push buttons for selectively energizing an ultra high frequency television tuner unit. The arrangement of push buttons 16 and the channel number plate 19 remains stationary; i.e., they do not rotate.

The tuner unit 13 comprises a channel selector shaft 21 extending frontwardly thereof. This channel selector shaft 21 is rotatable to different positions for adjusting the tuner unit 13 for reception of television signals in the different television channels. The fine tuning turret 12 comprises a plurality of fine tuning adjustment screws 22 arranged circularly therein, there being twelve of these fine tuning adjustment screws for a television tuner having the conventional twelve channel positions. Each of the fine tuning screws is associated with a different television channel, and is selectively adjustable by rotation thereof. The fine tuning turret 12 is attached to the channel selector shaft 21 and is rotatable therewith. When the channel selector shaft 21 and fine tuning turret 12 are rotated, the fine tuning adjusting screws of the turret selectively engage a fine tuning mechanism of the tuner unit, as described in the aforementioned copending patent application, for automatically adjusting the fine tuning of the tuning unit for each channel position of the channel selector shaft 21.

When the control knob 18 is in its normal or "in" position the mechanism is adapted for accomplishing channel selection of the tuning unit 13, this channel selection being accomplished either by manually turning the control knob 18 or by motor drive means electrically actuated when a selected push button 16 is depressed. When the control knob 18 is pulled to its "out" position, manual rotation thereof accomplishes fine tuning adjustment of the particular fine tuning adjustment means in the turret 12 which is associated with the selected channel, thereby permitting a correct setting for the fine tuning of the tuner unit 13 for the selected channel. After this fine tuning has been accomplished for a channel, the fine tuning is preset for that channel and the tuner unit 13 will be automatically properly adjusted for fine tuning whenever that channel is again selected.

The push buttons 16 are adapted to close a switch, when depressed, for closing an electrical contact thereby actuating an electric drive motor which is mechanically coupled to the channel selector shaft 21. A contact release shoe 23 is carried by the fine tuning turret 12 and is adapted to open the electrical contact when the motor has rotated the channel selector shaft 21 to the selected channel, thereby turning off the motor and leaving the tuner adjusted for the selected channel. A pilot light unit 24 is attached to the fine tuning turret 12, and rotates therewith. The pilot light unit 24 projects a light beam onto the channel number plate 19, for illuminating an area of the plate 19 at the number 21 of the selected channel, thereby providing a visual indication of the selected channel number.

The two axial positions of the control shaft 17 may be provided by means of a pair of detents 26 and 27 located on the control shaft 17, there being an expansible disk 28 positioned around the shaft 17 and adapted to selectively engage the detents 26 and 27 thereby holding the control shaft 17 in the selected axial position thereof. A hub 31 is positioned around the back end of the control shaft 17, and is provided with an arrangement of gears for accomplishing the aforesaid fine tuning of the fine tuning adjustment screws.

The arrangement thus far described is more fully disclosed in the aforesaid co-pending patent application.

In accordance with the present invention, the control shaft 17 and control knob 18 are hollow, and a channel indicator rod 41 is positioned concentrically therewithin and is rotatable with respect thereto. An indicator knob 42 is attached to the rod 41 at the outer end thereof, and is provided with a channel indicator mark 43 near the rim thereof. The inner end of the rod 41 is provided with an outwardly extending flange 46 for captivating the rod 41 to the control shaft 17 with respect to axial movement thereof. A flat tongue member 47 extends rearwardly from the rod 41 and into a similarly shaped opening 48 in the front end of the channel selector shaft 21. Alternatively, the opening 48 may be located in the fine tuning turret 12, since the fine tuning turret 12 and the the channel selector shaft 21 are connected together to rotate in unison as described above.

When the control knob 18 and control shaft 17 are moved axially from one position to the other, the rod 41 and tongue member 47 will move axially therewith, the tongue member 47 always remaining in the opening 48 of the channel selector shaft 21 so that the rod 41, and the indicator knob 42 carrying the channel indicator mark 43, will always rotate in unison with rotation of the channel selector shaft 21. The channel indicator mark 43 is located on the indicator knob 42 so that this mark 43 will always be toward whichever push button 16 is associated with the channel position of the channel selector shaft 21. Thus, I have provided a mechanically operated visual channel indicating means which is simple and reliable in operation, and which is economical to manufacture. My mechanically operated channel indicator will continue to function for providing visual channel indication in the event that the pilot light unit 24 ceases to function.

The flat tongue 47 preferably is located slightly off center with respect to the axis of the rod 41 as shown, so that in assembling the mechanism the channel indicator mark 43 will always be properly located and cannot be reversed 180° from its proper location with respect to the push buttons 16.

While a preferred embodiment of the invention has been shown and described, various other embodiments and modifications thereof will be apparent to those skilled in the art, and will fall within the scope of invention as defined in the following claims.

What I claim is:

1. In a tuner actuator mechanism having a rotatable control shaft selectively movable to two axial positions for selectively adjusting the channel selection and fine tuning of a tuner unit and further having means providing channel indicia positioned around said control shaft in a plane perpendicular to the axis thereof, said tuner unit being provided with a rotatable channel selector shaft axially aligned with said control shaft, the improvement consisting of a visual channel indicator comprising a rod positioned concentrically through said control shaft and captivated to move axially therewith, means continuously coupling said rod at the inner end thereof to said channel selector shaft whereby said rod will rotate in unison with said channel selector shaft and is axially movable with respect thereto, and means attached to said rod for indicating individual channel indicia in accordance with the rotary position of said channel selector shaft.

2. A channel indicator as claimed in claim 1, in which said last-named means comprises a knob attached to said rod at the outer end thereof and provided with a channel indicator mark.

3. A channel indicator as claimed in claim 1, in which said rod and channel selector shaft members are coupled together by means comprising a flat tongue extending longitudinally from one of said members and into an opening provided longitudinally in the other of said members.

4. A channel indicator as claimed in claim 3, in which said tongue and opening are off-center with respect to the axes of said rod and channel selector shaft.

References Cited in the file of this patent

UNITED STATES PATENTS

| | | |
|---|---|---|
| 2,242,768 | Wells et al. | May 20, 1941 |
| 2,650,270 | Mucher | Aug. 25, 1953 |
| 2,738,758 | Cutler et al. | Mar. 20, 1956 |
| 2,811,867 | Hogberg | Nov. 5, 1957 |
| 2,914,953 | Tyzack | Dec. 1, 1959 |
| 2,962,903 | Kemeny | Dec. 6, 1960 |
| 2,970,481 | Summerer | Feb. 7, 1961 |